(12) United States Patent
Karlsson

(10) Patent No.: US 8,078,896 B2
(45) Date of Patent: Dec. 13, 2011

(54) ADAPTIVE POWER SAVING

(75) Inventor: David Karlsson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 414 days.

(21) Appl. No.: 12/402,558

(22) Filed: Mar. 12, 2009

(65) Prior Publication Data
US 2010/0235664 A1      Sep. 16, 2010

(51) Int. Cl.
G06F 1/32           (2006.01)
(52) U.S. Cl. .................. 713/323; 713/320; 713/324
(58) Field of Classification Search .................. 713/320, 713/323, 324
See application file for complete search history.

(56) References Cited

U.S. PATENT DOCUMENTS

| 5,504,907 A | 4/1996 | Stewart et al. |
| 7,383,457 B1 | 6/2008 | Knight |
| 2007/0050654 A1 | 3/2007 | Switzer et al. |

FOREIGN PATENT DOCUMENTS

| EP | 0 750 248 A2 | 12/1996 |
| EP | 1 617 315 A1 | 1/2006 |

OTHER PUBLICATIONS

International Search Report dated Jan. 29, 2010 issued in corresponding PCT application No. PCT/IB2009/053989, 17 pages.
International Preliminary Report on Patentability dated May 26, 2011 issued in corresponding PCT application No. PCT/IB2009/053989, 12 pages.

*Primary Examiner* — Glenn A Auve
(74) *Attorney, Agent, or Firm* — Snyder, Clark, Lesch & Chung, LLP

(57) ABSTRACT

A device may enter a first active state associated with a device, exit the first active state and entering a sleep state associated with the device when user input is not received within a inactivity period, receive a first user input at the device during the sleep state, measure an elapsed time between a start of the sleep state and the first user input, and increase the inactivity period of the device when the elapsed time is less than a particular threshold.

20 Claims, 8 Drawing Sheets

ADAPTIVE POWER SAVING

BACKGROUND

Many of today's high tech consumer products include a power savings program. In portable devices, the power savings program may play an important role in minimizing user inconvenience, by extending time between recharges.

Typically, when a user stops providing input to a device for more than a particular period of time, the device may enter a power savings mode, in which the device cuts off power from being delivered to certain components. Subsequently, upon detecting additional user input (e.g., a tap on a keypad), the device may restore power to the components.

In some instances, however, the device entering the power savings mode can hinder the user from using the device without interruptions. To cope with such a situation, some devices allow the user to modify the time the device may wait until it enters the power savings mode. However, such configurability may not be convenient for several reasons, e.g., many users may not be able to find menus or mechanisms to change the wait time; users may forget to reset the wait time, resulting in premature power drain; users may find it difficult to set an ideal wait time for the device; some users may expect the device to work well out-of-the-box, etc.

Other devices that do not allow the users to change the wait time suffer from lack of flexibility to deal with individual characteristics of each user, such as different reading speed, user reaction times, etc. In other devices, an ideal wait time for one user may be different from that of another user.

SUMMARY

According to one aspect, a method may include entering a first active state associated with a device, exiting the first active state and entering a sleep state associated with the device when user input is not received within a inactivity period, receiving a first user input at the device during the sleep state, measuring an elapsed time between a start of the sleep state and the first user input, and increasing the inactivity period of the device when the elapsed time is less than a particular threshold.

Additionally, increasing the inactivity period may include one of entering a second active state whose inactivity period is longer than that of the first active state, or setting a value of the inactivity period to a larger value and entering the first active state.

Additionally, increasing the inactivity period may include putting the device in a second active state whose inactivity period is shorter than the inactivity period of the first active state when the elapsed time is greater than the particular threshold.

Additionally, the method may further include, during the sleep state, reducing or eliminating power that is delivered to a component of the device.

Additionally, the method may further include, in the second active state, restoring power to the component of the device.

Additionally, the method may further include, when the elapsed time is greater than a second threshold, causing the device to be in an initial state associated with the device.

Additionally, the method may further include, when the elapsed time is greater than the particular threshold and less than the second threshold, returning the device to the first active state.

Additionally, receiving the first user input may include receiving input via a keypad, a touch screen, control buttons, a camera, an accelerometer, a gyroscope, or a microphone.

Additionally, the method may further include, during the first active state, measuring a time elapsed between previous input and current input; and when the time elapsed between the previous input and the current input is less than the inactivity period, remaining in the first active state.

According to another aspect, a device may include an input component to receive user input, an output component, and a processor. The processor may be configured to enter a sleep state when first user input is not received within a inactivity period, decrease power being delivered to the output component in the sleep state, receive second user input during the sleep state, determine a time between a start of the sleep state and the second user input, and, when the time between the start of the sleep state and the second user input is shorter than a threshold, enter an active state whose inactivity period is longer than a inactivity period of a previous active state.

Additionally, the processor may be further configured to restore the power to the output component when the device enters the active state or another active state.

Additionally, the processor may be further configured to enter another sleep state from the other active state when no user input is provided at the output component during a inactivity period associated with the other active state.

Additionally, the processor may be further configured to enter another active state whose inactivity period is shorter than the inactivity period of the previous active sate when the time between the start of the sleep state and the second user input is longer than a second threshold.

Additionally, the input component may include at least one of a keyboard, keypad, control buttons, or touch screen.

Additionally, the device may include at least one of a cell phone, an electronic notepad, a gaming console, a laptop computer, a personal digital assistant, or a personal computer.

According to yet another aspect, a computer-readable medium may include computer-executable instructions. The computer-executable instructions may include instructions for entering a first active state associated with a device, exiting the first active state and entering a sleep state associated with the device when the device does not receive user input within a first inactivity period associated with the first active state, receiving a first user input at the device during the sleep state, and measuring an elapsed time between a start of the sleep state and the first user input. Further, the computer-executable instructions may include instructions for, when the elapsed time is less than a particular threshold, entering a second active state.

Additionally, the inactivity period of the second active state may be either longer than or same as the first inactivity period.

Additionally, the instructions for exiting the first active state and entering the sleep state may include instructions for curtailing or eliminating power being delivered to an output component.

Additionally, the instructions for entering the second active state may include instructions for restoring power to the output component.

Additionally, the computer-readable medium may further include instructions for entering a third active state when a time elapsed between a start of the sleep state and a second user input is greater than a second threshold.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. As used herein, the term "power savings mode" may refer to a device state in which the device curtails power consumption. In addition, as used herein, the terms "inactivity period," "inactivity time," "wait period," or "wait time" may refer to a period of time between the start of power savings mode and the moment of a user's last input to the device prior to the onset of power savings mode (e.g., a period of user inactivity). Accordingly, if a user provides no input during a inactivity period, the device will enter the power savings mode.

Figure 1A:
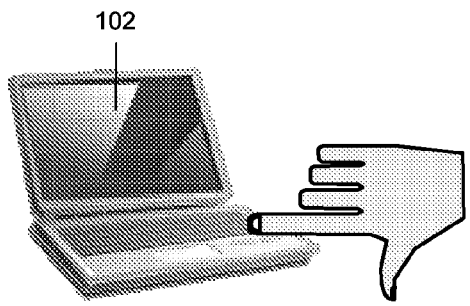
FIGS. 1A and 1B illustrate the concepts described herein.
Figure 1B:
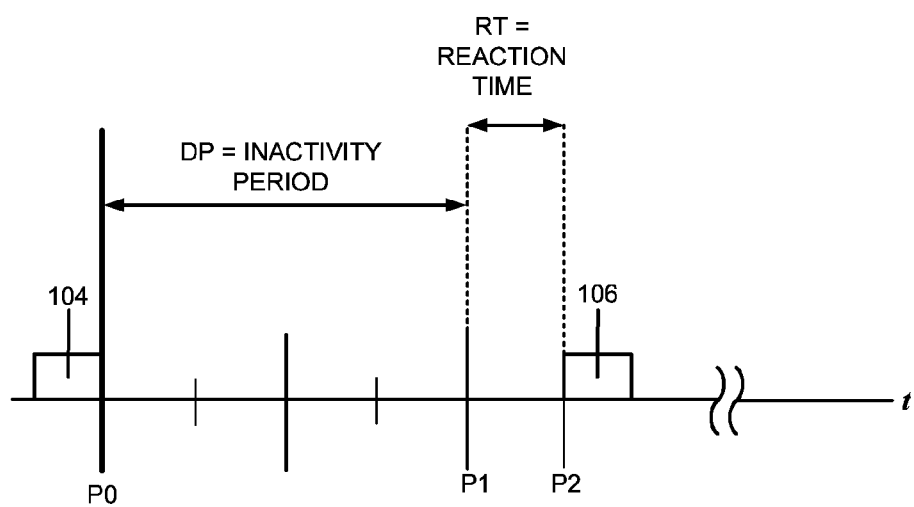

In the following, a device may adaptively change its inactivity period based on user feedback. FIGS. 1A and 1B illustrate one implementation of the above concept. FIG. 1A shows a device 102 that is capable of entering power savings mode. Device 102 may include an application (e.g., a video player). FIG. 1B shows a timing diagram of user input at device 102. Signal 104 represents user's first input at time P0 (e.g., a button press) and signal 106 represents user's second input at time P2. Assume that, after time P0, the user does not provide input to device 102 for a inactivity period (DP in FIG. 1B); that device 102 enters the power savings mode at time P1; and that the user provides second input 106 after a reaction time (RT) elapses after time P1.

In the above, if the user has been engaged in using device 102 (e.g., watching a video), the user may provide input at time P2 immediately after device 102 enters the power savings mode at time P1. That is, RT may be small (e.g., RT<some threshold). In such an instance, device 102 may thereafter increase the inactivity period, such that the user may be less frequently interrupted by device 102 entering the power savings mode. Conversely, if RT is long (e.g., RT>threshold), device 102 may either decrease DP or leave DP the same.

In the above, depending on how quickly a user provides input to device 102 after device 102 enters the power savings mode, device 102 may increase or decrease the inactivity period. By tailoring the inactivity period to the user and/or user activity, device 102 may reduce the number of interruptions (e.g. turning off a display of device 102) that are sometimes associated with the power savings mode, without the user having to manually or explicitly modify the configuration of device 102.

Figure 2:
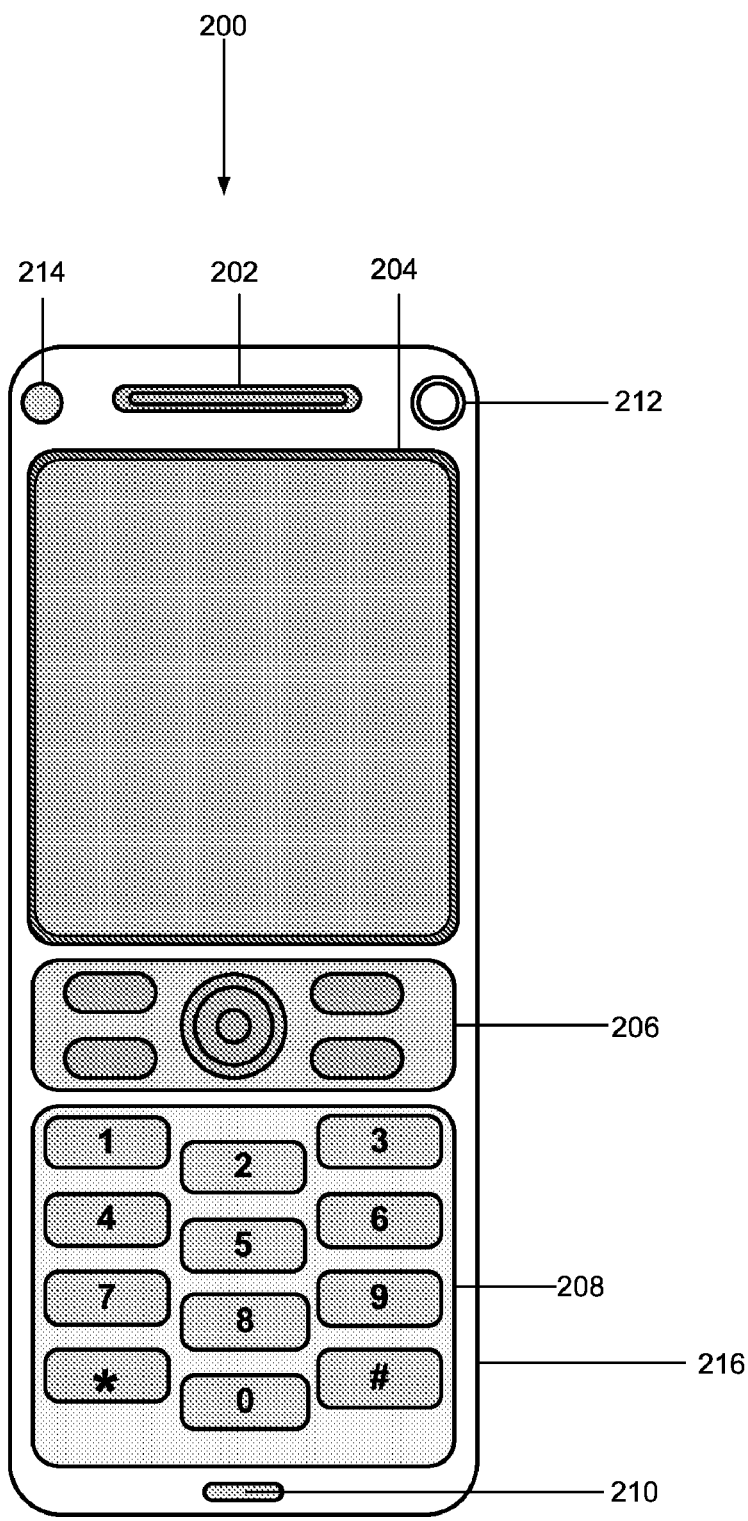
FIG. 2 is a diagram of an exemplary device that implements the concepts described herein.

FIG. 2 is a diagram of an exemplary device 200 in which the concepts described herein may be implemented. Device 200 may include any of the following devices: a mobile telephone; a cellular phone; a personal communications system (PCS) terminal that may combine a cellular radiotelephone with data processing, facsimile, and/or data communications capabilities; an electronic notepad, a laptop, and/or a personal computer; a personal digital assistant (PDA) that can include a telephone; a gaming device or console; a peripheral (e.g., wireless headphone); a digital camera; or another type of computational or communication device.

In this implementation, device 200 may take the form of a portable phone (e.g., a cell phone). As shown in FIG. 2, device 200 may include a speaker 202, a display 204, control buttons 206, a keypad 208, a microphone 210, sensors 212, a front camera 214, and a housing 216. Speaker 202 may provide audible information to a user of device 200. Display 204 may provide visual information to the user, such as an image of a caller, video images, or pictures. Control buttons 206 may permit the user to interact with device 200 to cause device 200 to perform one or more operations, such as place or receive a telephone call. Keypad 208 may include a telephone keypad. Microphone 210 may receive audible information from the user.

Sensors 212 may collect and provide, to device 200, information (e.g., acoustic, infrared, etc.) that is used to aid the user in capturing images or in providing other types of information (e.g., a distance between a user and device 200). Front camera 214 may enable a user to view, capture and store images (e.g., pictures, video clips) of a subject in front of device 200. Housing 216 may provide a casing for components of device 200 and may protect the components from outside elements.

Figure 3:
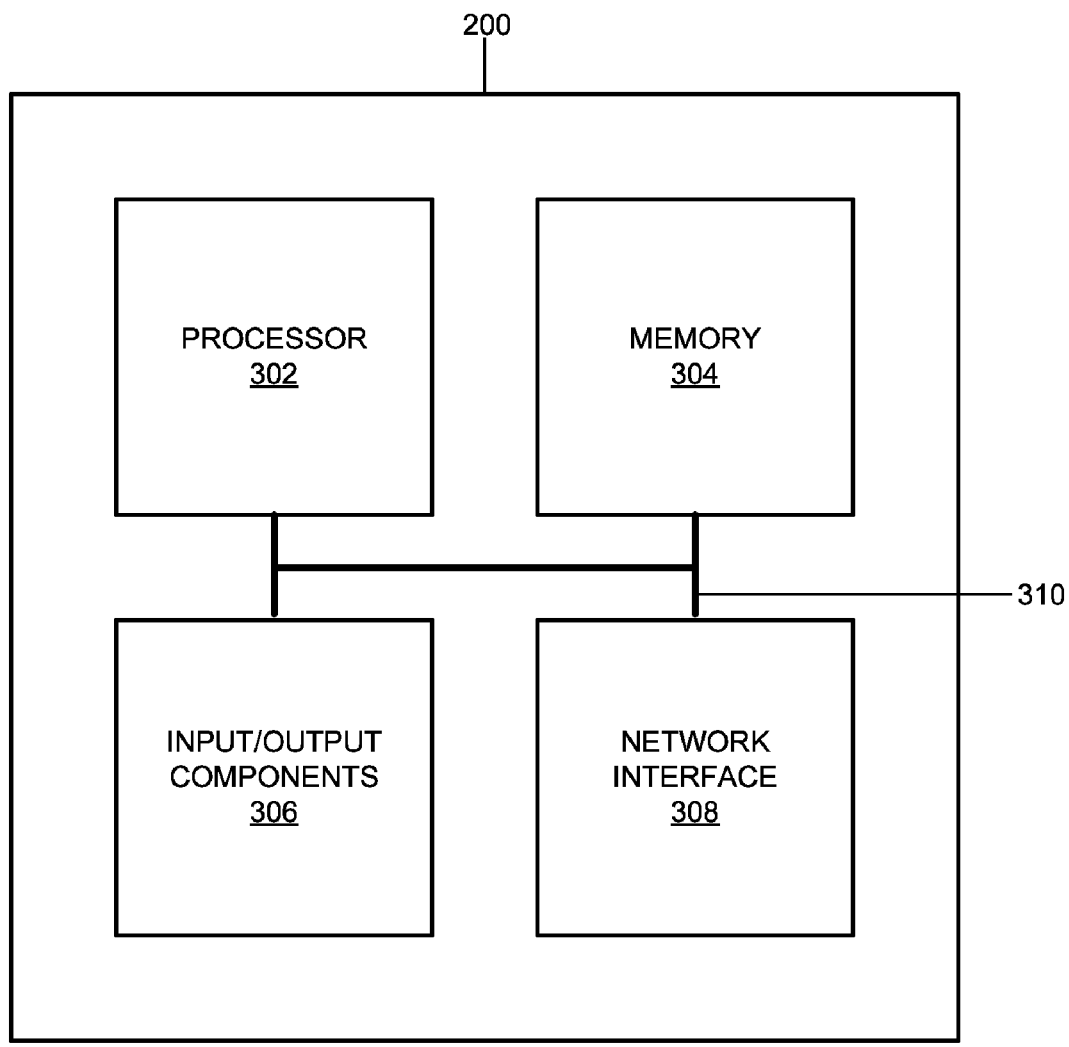
FIG. 3 is a block diagram of the device of FIG. 2.

FIG. 3 is a block diagram of the device of FIG. 2. As shown in FIG. 3, device 200 may include a processor 302, a memory 304, input/output components 306, a network interface 308, and a communication path 310. In different implementations, device 200 may include additional, fewer, or different components than the ones illustrated in FIG. 2. For example, device 200 may include additional network interfaces, such as interfaces for receiving and sending data packets.

Processor 302 may include a processor, a microprocessor, an Application Specific Integrated Circuit (ASIC), a Field Programmable Gate Array (FPGA), and/or other processing logic (e.g., audio/video processor) capable of processing information and/or controlling device 200. Memory 304 may include static memory, such as read only memory (ROM), and/or dynamic memory, such as random access memory (RAM), or onboard cache, for storing data and machine-readable instructions. Memory 304 may also include storage devices, such as a floppy disk, CD ROM, CD read/write (R/W) disc, and/or flash memory, as well as other types of storage devices.

Input/output components 306 may include a display screen (e.g., display 102), a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to device 200. In some implementations, input/output components 306 may include an accelerometer or a gyroscope that may sense whether a user tilts device 200 away from or toward the user, and provide input to device 200. Such input (e.g., tilting device 200 toward or away from the user) may be used, for example, to scroll up or down a web page on a browser installed on device 200.

Network interface 308 may include any transceiver-like mechanism that enables device 200 to communicate with other devices and/or systems. For example, network interface 308 may include mechanisms for communicating via a network, such as the Internet, a terrestrial wireless network (e.g., a WLAN), a cellular network, a satellite-based network, a WPAN, etc. Additionally or alternatively, network interface 308 may include a modem, an Ethernet interface to a LAN, and/or an interface/connection for connecting device 200 to other devices (e.g., a Bluetooth interface).

Communication path 310 may provide an interface through which components of device 200 can communicate with one another.

Figure 4:
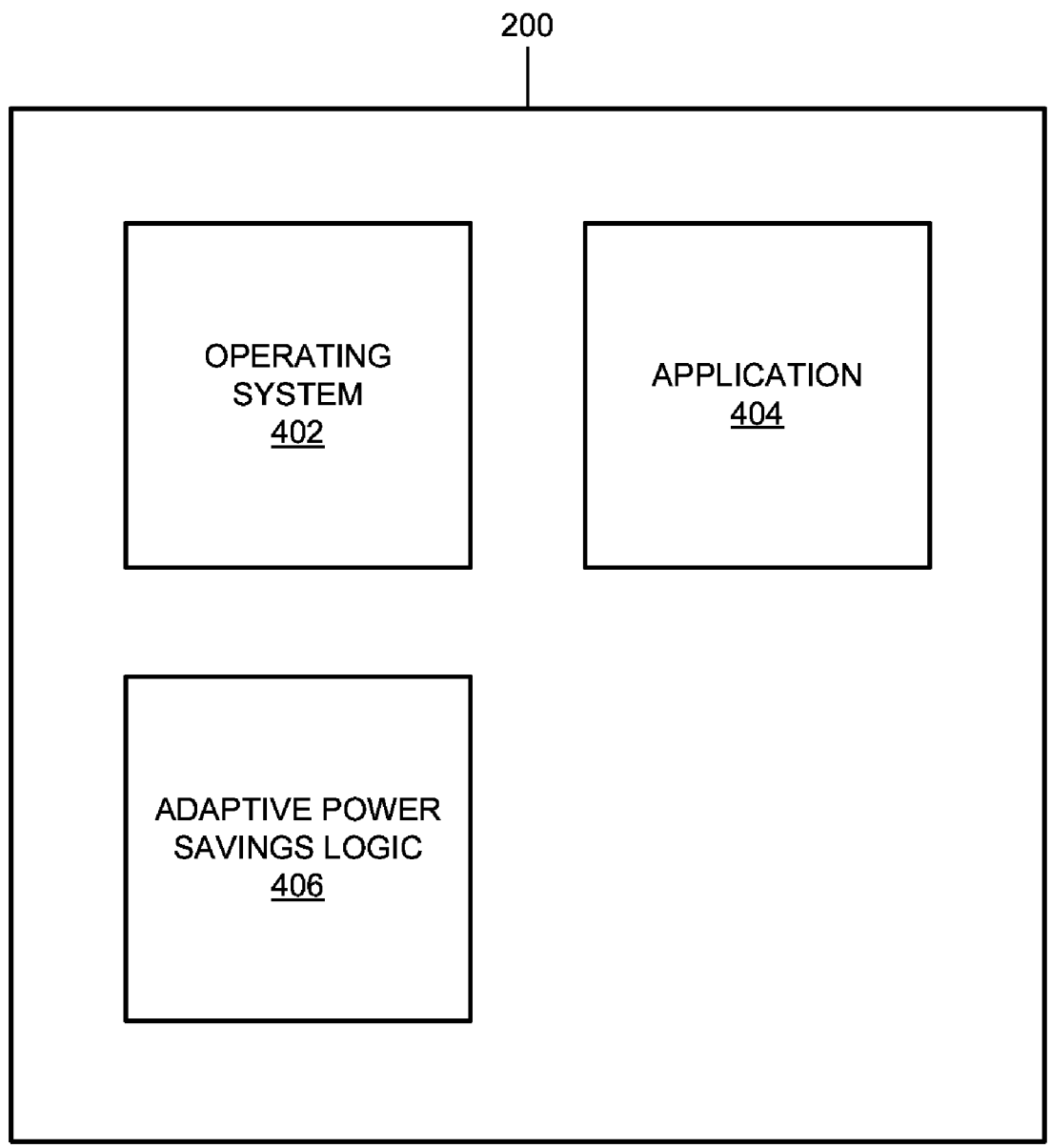
FIG. 4 is a functional block diagram of the device of FIG. 2.

FIG. 4 is a functional block diagram of device 200. As shown, device 200 may include operating system 402, application 404, and adaptive power savings logic 406. Depending on the implementation, device 200 may include additional, fewer, or different components than those illustrated in FIG. 4 (e.g., additional applications).

Operating system 402 may include computer programs for managing hardware and software resources of device 200. Operating system 402 may manage, for example, its file system, device drivers, communication resources (e.g., transmission control protocol (TCP)/IP stack), event notifications, etc. Application 404 may include a hardware and/or software component for performing a specific set of tasks, and may include applications such as a calling interface, address book, media player, email client, instant messaging application, a browser, etc.

Adaptive power savings logic 406 may include hardware and/or software components for causing device 200 to enter a power savings mode, control power delivered to different components of device 200 (e.g., display 204), and/or adaptively change the duration of a inactivity period.

Figure 5:
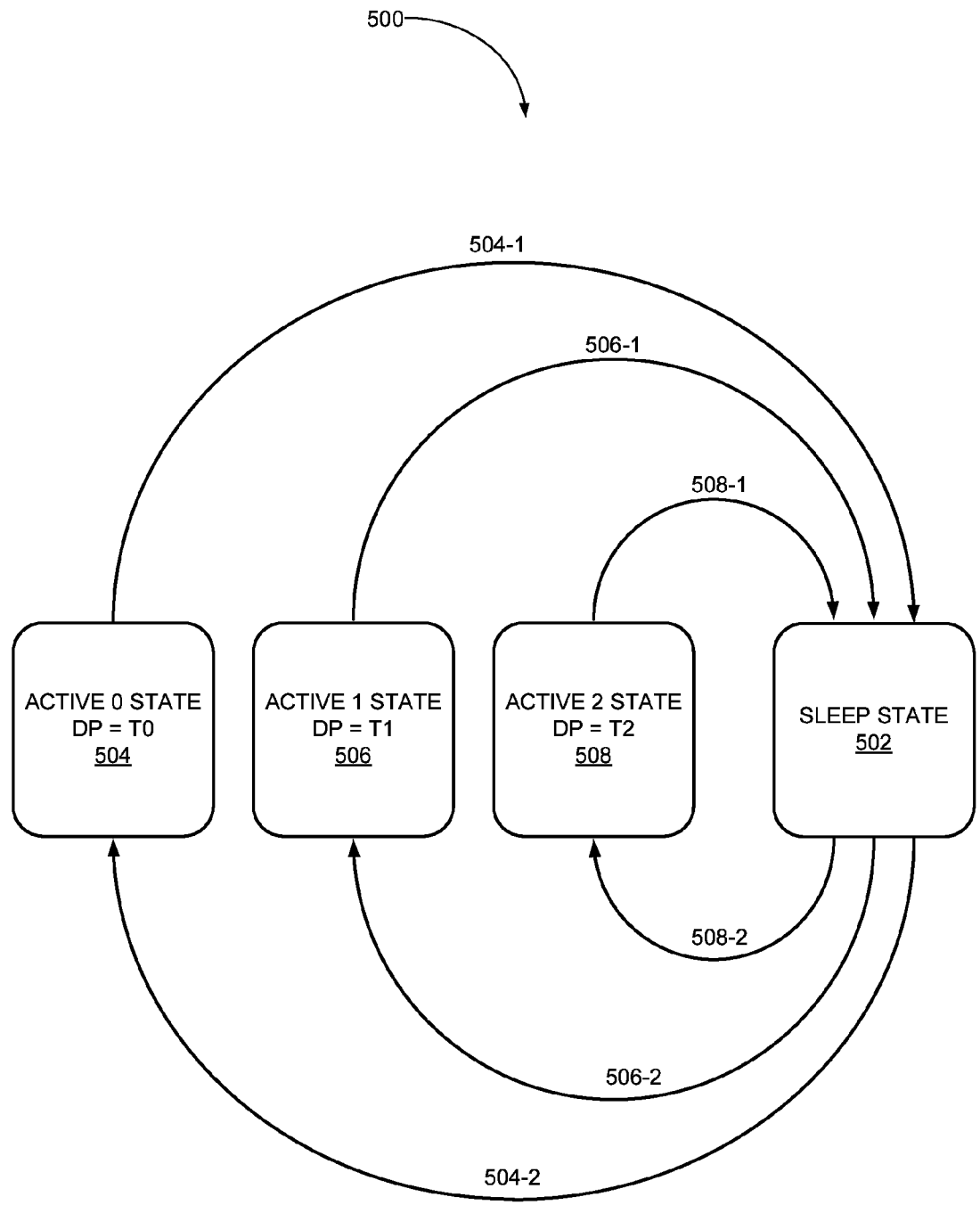
FIG. 5 illustrates an exemplary state transition diagram whose states and state transition arcs may be implemented in adaptive power savings logic of FIG. 4.

In one embodiment, adaptive power savings logic 406 may implement a series of states and state transitions that may be represented as state transition diagrams. FIG. 5 shows one exemplary state transition diagram 500 whose states and state transitions may be implemented in adaptive power savings logic 406. As shown, state transition diagram 500 may include a sleep state 502, active 0 state 504, active 1 state 506, active 2 state 508, and transition arcs 504-1, 504-2, 506-1, 506-2, 508-1, and 508-2. Depending on the implementation, state transition diagram 500 may include additional and/or fewer states (e.g., active 4 state, active N state (N∈{0, 1, 2 . . . }), etc.) and/or transition arcs than those illustrated in FIG. 5.

Sleep state 502 may be associated with the power savings mode of device 200. When device 200 is in the power savings mode, adaptive power savings logic 406 may be in sleep state 502. Active states 504-508 may be associated with an "awake state" (i.e., device 200 is not in the power savings mode) and inactivity periods T0, T1, and T2, respectively. When device 200 is not in the power savings mode, device 200 may be in any of active states 504-508.

In one implementation, when device 200 initially powers up, adaptive power savings logic 406 may enter active 0 state 504. While device 200 is in active 0 state 504, if there is no user interaction during inactivity period T0, adaptive power savings logic 406 will exit active 0 state 504 and enter sleep state 502 in accordance with transition arc 504-1. In sleep state 502, adaptive power savings logic 406 decreases power being delivered to components that are not likely to provide useful functions to the user, and may unnecessarily draw power.

In addition, as soon as device 200 enters sleep state 502, adaptive power savings logic 406 may start a timer that stops when the user provides input to device 200. Assuming that the user provides input and the time measured by the timer is T, adaptive power savings logic 406 may exit sleep state 502 and transition into one of active states 506 and 508, in accordance with the following rule: if T is less than a threshold TH and the last active state was active N state (e.g., N=0 or 1), then adaptive power savings logic 406 will enter active N+1 state. The active N+1 state may be associated with a inactivity period that is longer than the inactivity period of active N state.

If T is greater than another threshold TR, where TR>TH, adaptive power savings logic 406 will return to active 0 state 504. If T is less than or equal to TR (T≦TR) and greater than or equal to TH (T≧TH), adaptive power savings logic 406 may return to the active state that adaptive power savings logic 406 was in prior to entering sleep state 502.

In the above, the values of T0, T1, and T2 may be constrained by the following relationship: T0≦T1≦T2. The relationship indicates that adaptive power savings logic 406 is most aggressive in trying to save power in active 0 state 504 and least aggressive in active 2 state 508.

According to the relationship, an active N state can have the same inactivity period as an active N−1 state (e.g., the relationship is not T0<T1<T2). Thus, it is possible to have a recurring pattern of input, rather than a single input, that causes an increase in the inactivity period. For example, assume that T0 and T1 are 20 seconds and T2 is 40 seconds. In this example, the user has to provide inputs in less than 20 seconds after the onset of sleep state 502 twice before adaptive power savings logic 406 transitions to active 2 state 508, where the inactivity period is 40 seconds.

Figure 6:
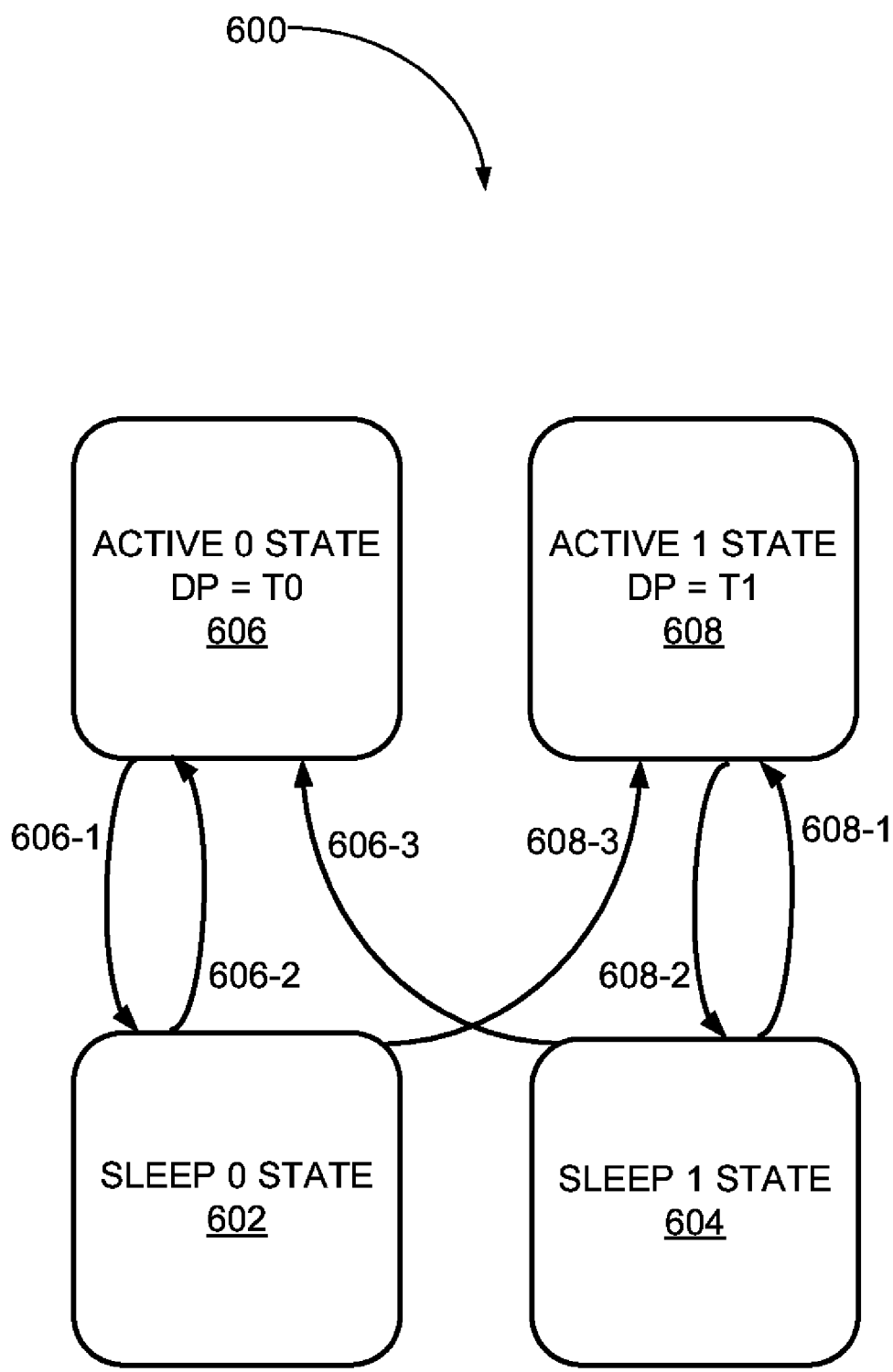
FIG. 6 illustrates another exemplary state transition diagram whose states and state transition arcs may be implemented in the adaptive power savings logic of FIG. 4.

FIG. 6 shows another exemplary state transition diagram 600 whose states and state transition arcs may be implemented in adaptive power savings logic 406 As shown, state transition diagram 600 may include a sleep 0 state 602, sleep 1 state 604, active 0 state 606, active 1 state 608, and transition arcs 606-1, 606-2, 606-3, 608-1, 608-2, and 608-3. Depending on the implementation, state transition diagram 500 may include additional and/or fewer states (e.g., active M state (M∈{0, 1, 2 . . . }, sleep P state (P∈{0, 1, 2 . . . }, etc.) and/or transition arcs than those illustrated in FIG. 6.

Sleep 0 state 602 and sleep 1 state 604 may be associated with the power savings mode of device 200, and active 0 state 606 and active 1 state 608 may be associated with "awake" states. In one implementation, when device 200 initially powers up, adaptive power savings logic 406 may enter active 0 state 606. While device 200 is in active 0 state 606, if there is no user input during a inactivity period T0, adaptive power savings logic 406 will exit active 0 state 604 and enter sleep 0 state 602, in accordance with transition arc 606-1.

As soon as device 200 enters sleep 0 state 602, adaptive power savings logic 406 will start a timer that stops when a user provides input to device 200. Assuming that the user provides input and the time measured by the timer is T, adaptive power savings logic 406 may exit sleep 0 state 602 and transition into one of active states 606 and 608, in accordance with the following rule: if T is greater than or equal to a threshold TH0, adaptive power savings logic 406 will return to active 0 state 606, and if T is less than TH0, adaptive power savings logic 406 will enter active 1 state 608. In active 1 state 608, adaptive power savings logic 406 may be less aggressive in saving power (e.g., T1>T0) than in active 0 state 606 (e.g., it takes longer for device 200 to enter the power savings mode).

If device 200 enters active 1 state 608 and if there is no user interaction during inactivity period T1, adaptive power savings logic 406 will exit active 1 state 608 and enter sleep 1 state 604. When device 200 enters sleep 1 state 608, adaptive power savings logic 406 will start a timer that stops when the user provides input to device 200. Assuming that the user provides input and the time measured by the timer is T, adaptive power savings logic 406 may exit sleep 1 state 604 and transition into one of active states 606 and 608 in accordance with the following rule: if T is less than or equal to a threshold TH1, adaptive power savings logic 406 will return to active 1 state 608, and if T is greater than TH1, adaptive power savings logic 406 will enter active 0 state 606.

In state transition diagram 600, whether adaptive power savings logic 406 enters active 0 state 606 or active 1 state 608 from sleep 0 state (or sleep 1 state) may be independent of the identity of the previous active state of adaptive power savings logic 406. Instead, when adaptive power savings logic 406 is in sleep 0 state 602, the duration of time T determines into which active state adaptive power savings logic 406 will enter. In contrast, in state transition diagram 500, as described above, the prior active state of adaptive power savings logic 406 and time T together determine the active state that adaptive power savings logic 406 will enter.

Depending on the embodiment, adaptive power savings logic 406 may implement state transition diagrams other than state transition diagrams 500 and 600, for modifying the inactivity period. For example, in one implementation, adaptive power savings logic 406 may implement a state transition diagram that has more than three active states or one sleep state.

In a different implementation, adaptive power savings logic 406 may employ only one sleep state and one active state. In such an implementation, adaptive power savings logic 406 may keep a list of several possible values for the inactivity period. When the user provides a feedback (e.g., a reaction time) after device 200 enters the power savings mode, adaptive power savings logic 406 may replace the value of the inactivity period. For example, assume that a set of possible values for the inactivity period are {5 min, 20 min, 30 min} and the current inactivity period is 5 min. When the user's reaction time is less than a threshold (e.g., 1 second), adaptive power savings logic 406 may simply set the value to 20 minutes.

Exemplary Processes for Discreet Feature Highlighting

Figure 7:
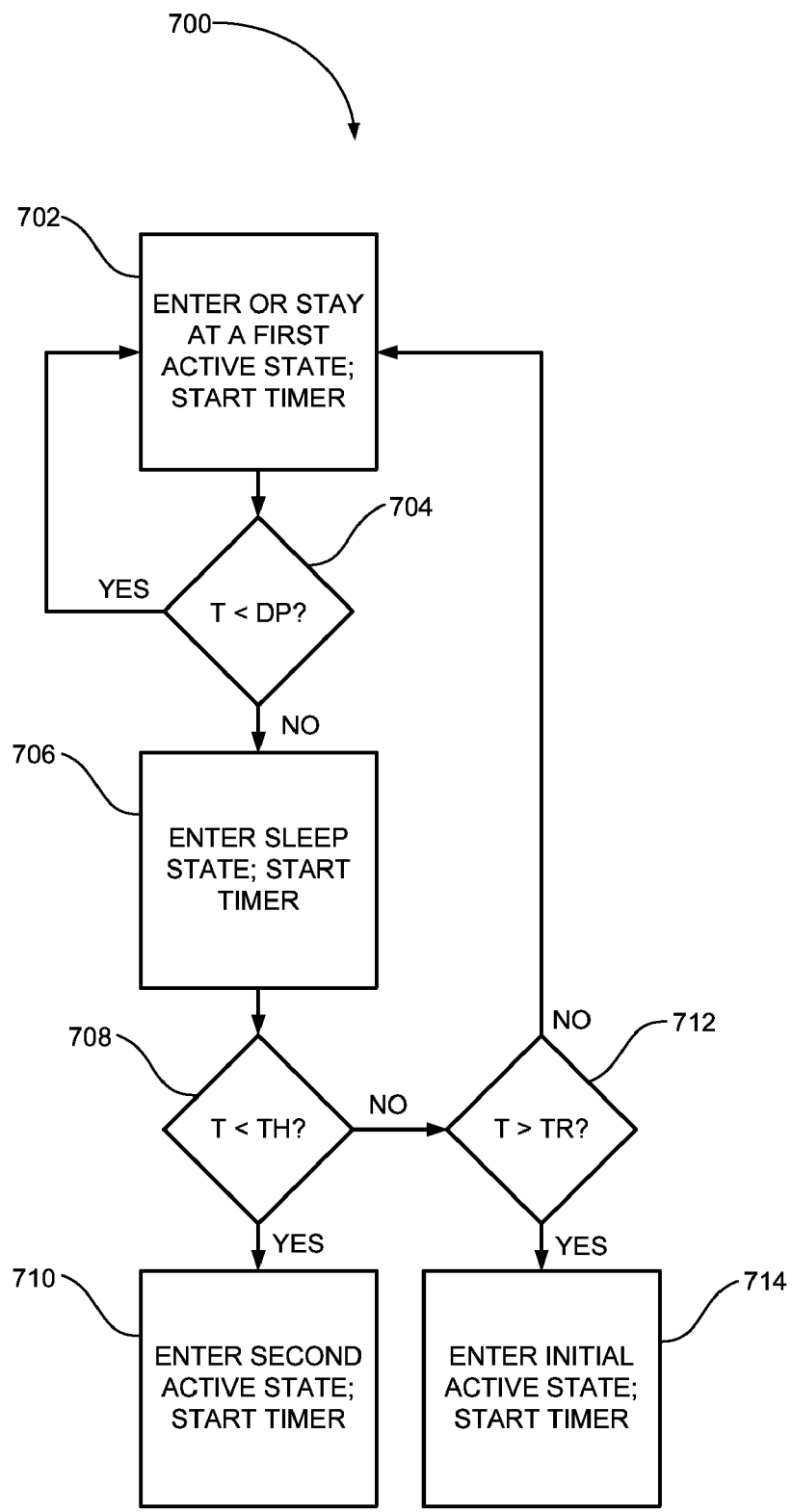
FIG. 7 shows a flow diagram illustrating an exemplary process associated with the state transition diagram of FIG. 5.

FIG. 7 is flow diagram of an exemplary process 700 associated with state transition diagram 500. Depending on the implemetnation, a different process may be associated with a state transition diagram (e.g., state transition diagram 600) that is implemented by adaptive power savings logic 406.

Assuming that device 200 is turned on, adaptive power savings logic 406 may enter or remain in a first active state (block 702). As described earlier, the first active state may include active 0 state 504, or alternatively, a different active state, such as active 1 state 506. When adatpive power savings logic 406 enters the first active state, a timer may be started (block 702).

In the first active state, when device 200 receives input, adaptive power savings logic 406 may determine whether the time measured by the timer is greater than a inactivity period of the first active state (e.g., whether T>DP) (block 704). If the measured time is less than the inactivity period, process 700 may return to block 702, and adaptive power savings logic 406 may stay in the first active state. The user input may indicate that the user is interacting with device 200, and that device 200 should not enter the power savings mode.

If the measured time is not less than the inactivity period, active power savings logic 406 may enter a sleep state (block 706). The measured time being longer than the inactivity period may indicate that the user is no longer interacting with device 200, and therefore, device 200 can decrease power being delivered to certain components of device 200. As soon as active power savings logic 406 enters the sleep state, active power savings logic 406 may restart a timer (block 706).

In the sleep state, when device 200 receives input, adaptive power savings logic 406 may determine whether the time measured by the timer is less than a threshold time (TH) (block 708). That the user provided input within the threshold time (e.g., 1 second) may indicate that the user is disturbed by the decrease in power, and that the user wishes device 200 to re-enter an active state.

If the measured time is less than the threshold (block 708—YES), adaptive power savings logic 406 may enter a second active state (block 710), such as active 1 state 506 or active 2 state 508. The second active state may have a longer inactivity period than the first active state, and thus, adaptive power savings logic 406 may take longer to enter the sleep state.

If the measured time is not less than the threshold (block 708—NO), adaptive power savings logic 406 may determine whether the measured time is greater than a reset time (TR) (block 712). If so (block 712—YES), active power savings logic 506 may return to the initial state (e.g., active 0 state 504) (block 714). Otherwise (block 712—NO), adaptive power savings logic 406 may revisit the first active state (block 702).

EXAMPLE

Figure 8A:
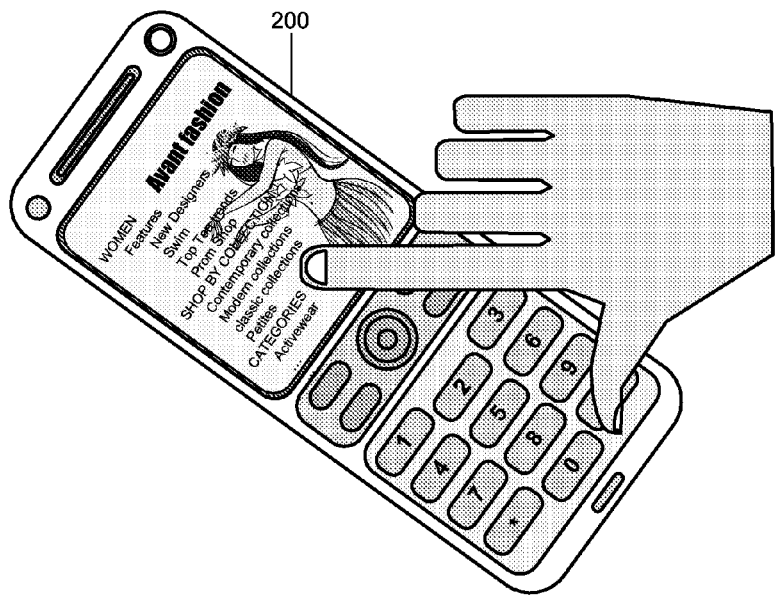
FIGS. 8A-8D illustrate an example associated with adaptively saving power.
Figure 8B:
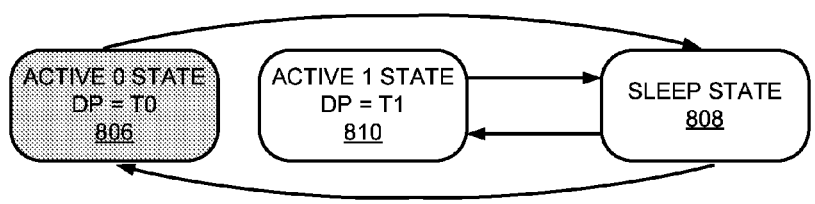
Figure 8C:
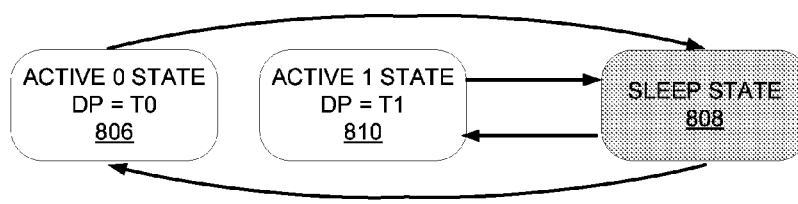
Figure 8D:
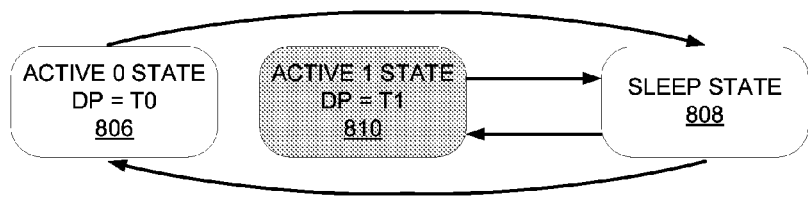

FIGS. 8A-8D illustrate an example associated with adaptively saving power. The example is consistent with exemplary process 700 described above with reference to FIG. 7. FIG. 8A shows device 200. Assume that the user is examining a web page via display 204 of device 200. FIGS. 8B-8D show states that adaptive power savings logic 406 is in at different moments during device 200's use. Assume that inactivity periods for active 0 state 806 and active 1 state 808 are 1 minute (min) and 5 min, respectively. In addition, assume that John is shopping on-line for his wife's present.

As shown in FIG. 8B, when device 200 displays a web page, adaptive power savings logic 406 in device 200 is in active 0 state 808. At the point in time, John is reading the web page, and, after 1 minute, as shown in FIG. 8C, adaptive power savings logic 406 enters sleep state 808. In sleep state 808, to save power, adaptive power savings logic 406 turns off display 204 of device 200.

John immediately touches display 204 (e.g., touch screen) when display 204 turns off. Assuming that a threshold time is 3 seconds, and that John touches the display within 3 seconds of adaptive power savings logic 406 entering sleep state 808, adaptive power savings logic 406 enters active 1 state 810, as illustrated in FIG. 8D.

Once adaptive power savings logic 406 enters active 1 state 810, assuming that John touches device 200, for example, to move to different web page, approximately every 5 minutes, device 200 no longer enters sleep state 808, because the inactivity period of active 1 state is 5 minutes. John continues to shop uninterrupted.

In the above example, depending on how quickly John provides input to device 200 after device 200 enters the power savings mode, device 200 may increase or decrease the inactivity period. By tailoring the inactivity period to the user and/or user activity, device 200 may reduce or eliminate the number of interruptions (e.g. turning off a display of device 200) that are sometimes associated with the power savings mode, without the user having to manually or explicitly modify the configuration of device 200.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to the exemplary processes illustrated in FIG. 7, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   entering a first active state associated with a device;
   exiting the first active state and entering a sleep state associated with the device when no user input is received within an inactivity period associated with the device;
   receiving, after a first elapsed time, a first user input at the device during the sleep state;
   exiting the sleep state and entering a second active state, based on the first user input;
   exiting the second active state and re-entering the sleep state when no user input is received within the inactivity period;
   receiving, after a second elapsed time, a second user input at the device during the sleep state; and
   adjusting the inactivity period of the device when each of the first elapsed time and the second elapsed time is outside a time interval between a first threshold and a second threshold.

2. The method of claim 1, wherein adjusting the inactivity period includes one of:
   exiting the sleep state and entering a third active state associated with another inactivity period that differs from the inactivity period of the device; or
   changing the inactivity period and re-entering the first active state.

3. The method of claim 1, wherein adjusting the inactivity period includes:
   exiting the sleep state and entering a third active state associated with another inactivity period that is shorter than the inactivity period of the device, when each of the first elapsed time and the second elapsed time is greater than the second threshold.

4. The method of claim 1, further comprising:
   during the sleep state, reducing or eliminating power to a particular component of the device.

5. The method of claim 4, further comprising:
   in the second active state, restoring power to the particular component of the device.

6. The method of claim 1, further comprising:
   when each of the first elapsed time and the second elapsed time is less than the first threshold, exiting the sleep state and entering a third active state associated with another inactivity period that is longer than the inactivity period of the device.

7. The method of claim 1, further comprising:
   when the second elapsed time is greater than the first threshold and less than the second threshold, maintaining the device in the second active state.

8. The method of claim 1, wherein receiving the first user input includes:
   receiving input via an accelerometer, or a gyroscope of the device.

9. The method of claim 1, further comprising:
   during the first active state, when the first elapsed time elapsed is greater than the first threshold and less than the second threshold, remaining in the first active state.

10. A device comprising:
    an input component to receive user input;
    an output component; and
    a processor to:
       enter a sleep state following an inactivity period associated with each of a number of active states in which power is delivered to the output component;
       decrease the power delivered to the output component in the sleep state;
       receive user input during the sleep state;
       determine an amount of time between a start of the sleep state and the user input;
       determine, for successive ones of the number of active states, that the amount of time between the start of the sleep state and the user input is shorter than a first threshold value or longer than a second threshold value; and
       enter another active state, subsequent to the successive ones of the number of active states, corresponding to a particular inactivity period that differs from an inactivity period corresponding to a previous active state with respect to the successive ones of the number of active states.

11. The device of claim 10, wherein the processor is further configured to:
    restore the power to the output component in the other active state.

12. The device of claim 10, wherein the particular inactivity period is longer than the inactivity period associated with the successive ones of the active states when the amount of time is shorter than the first threshold.

13. The device of claim 10, wherein the particular inactivity period is shorter than the inactivity period associated with the successive ones of the active states when the amount of time is longer than the second threshold.

14. The device of claim 10, wherein the input component includes at least one of:
    a gyroscope, or an accelerometer.

15. The device of claim 10, wherein the device includes:
    a cell phone.

16. A computer-readable medium including computer-executable instructions, the computer-executable instructions including instructions, that, when executed on one or more devices of a mobile communication device, cause the mobile communication device to:
- enter a first active state associated with the mobile communication device;
- enter, from the first active state, a sleep state associated with the mobile communication device when the mobile communication device does not receive user input within a first inactivity period associated with the first active state;
- receive, after a first elapsed time, a first user input at the mobile communication device during the sleep state;
- enter, from the sleep state, a second active state associated with the mobile communication device, based on the first user input;
- re-enter, from the second active state, the sleep state when no user input is received at the mobile communication device within the first inactivity period;
- receive, after a second elapsed time, a second user input at the mobile communication device during the sleep state;
- determine that each of the first elapsed time and the second elapsed time is outside a time interval between a first threshold and a second threshold; and
- enter, from the sleep state, a third active state associated with the mobile communication device, corresponding to a second inactivity period, wherein the first and second inactivity periods differ.

17. The computer-readable medium of claim 16, wherein, when each of the first elapsed time and the second elapsed time is less than the first threshold, the second inactivity period is longer than the first inactivity period.

18. The computer-readable medium of claim 16, wherein the instructions that cause the mobile communication device to enter the sleep state include instructions for reducing or eliminating power to an output component of the mobile communication device.

19. The computer-readable medium of claim 18, wherein the instructions that cause the mobile communication device to enter the second active state include instructions for restoring the power to the output component.

20. The computer-readable medium of claim 16, wherein, when each of the first elapsed time and the second elapsed time is greater than the second threshold, the second inactivity period is less than the first inactivity period.

* * * * *